United States Patent [19]
Saito et al.

[11] Patent Number: 5,241,435
[45] Date of Patent: Aug. 31, 1993

[54] SERVO INFORMATION RECORDING METHOD FOR A STORAGE APPARATUS

[75] Inventors: Shigeyoshi Saito; Yuji Hata; Takuji Ogawa; Jyousei Shimizu; Tsuyoshi Takahashi, all of Odawara; Masahiko Sega, Hiratuka; Kazuo Ono, Odawara, all of Japan

[73] Assignee: Hitachi, Ltd., Tokyo, Japan

[21] Appl. No.: 541,724

[22] Filed: Jun. 21, 1990

[30] Foreign Application Priority Data
Jun. 26, 1989 [JP] Japan .................................. 1-163360

[51] Int. Cl.5 .......................... G11B 5/55; G11B 5/02
[52] U.S. Cl. ................................. 360/78.04; 360/57; 360/61; 360/77.05; 360/75
[58] Field of Search .................... 360/40, 48, 53, 55, 360/57, 75, 77.02–77.11, 78.04–78.14, 61, 18

[56] References Cited

U.S. PATENT DOCUMENTS

| 4,701,815 | 10/1987 | Yada et al. | 360/77.06 |
| 4,777,544 | 10/1988 | Brown et al. | 360/75 |
| 4,864,434 | 9/1989 | Janz | 360/55 |

FOREIGN PATENT DOCUMENTS

| 59-2087 | 1/1984 | Japan . |
| 61-276110 | 12/1986 | Japan . |
| 63-105967 | 7/1988 | Japan . |
| 63-64812 | 12/1988 | Japan . |

Primary Examiner—Jerry Smith
Assistant Examiner—Steven R. Garland
Attorney, Agent, or Firm—Fay, Sharpe, Beall, Fagan, Minnich & McKee

[57] ABSTRACT

A method of recording a servo signal on each track of a magnetic disk includes a first signal for demagnetizing the magnetic disk and a second signal for forming the servo signal. The recording width (core width) of the magnetic head is made greater than the width of the track. Parts for recording signals and not recording signals are set in each track. The first and second signals are selected and recorded in the signal recording part, thereby to form the servo signal. Current to be conducted to the magnetic head is cut in the part for not recording signals, and the track is skipped to the next part for recording signals. When the recording of the track has ended, the magnetic head is moved to the next track, and the above steps are repeated.

12 Claims, 8 Drawing Sheets

SERVO INFORMATION RECORDING METHOD FOR A STORAGE APPARATUS

BACKGROUND OF THE INVENTION

The present invention relates to servo information recording technology. More particularly, it relates to techniques which are effective when applied to the operation of recording servo tracks in the manufacturing process of magnetic disks, and a magnetic disk apparatus which utilizes the techniques.

In a magnetic disk apparatus, a plurality of magnetic disks held coaxial are rotated. The recording surface of each of the magnetic disks is provided with a plurality of concentric tracks which are regions for recording information. A magnetic head which is disposed in opposition to the recording surface of the corresponding magnetic disk, is displaced radially of this magnetic disk so as to be located on a target track. Thereafter, the magnetic head records/reproduces information on/-from the target region of the recording surface. As a method for positioning the magnetic head onto the target track, it is known to record servo information on the recording surface of the magnetic disk beforehand and to use the servo information for the positioning.

With this method, the recording surface of one of a plurality of magnetic disks set is utilized. A specified servo pattern is concentrically recorded on the recording surface in advance. In case of, for example, a two-phase servo system, the servo pattern defines four servo regions $S_1$, $S_2$, $S_3$ and $S_4$ as regions for writing signals. A first position signal is generated by comparing the magnitudes of the signals of the regions $S_1$ and $S_3$ among the four servo regions, while a second position signal is generated by comparing the magnitudes of the signals of the regions $S_2$ and $S_4$. Subsequently, the servo information is obtained from the first and second position signals (in two phases).

A technique for writing such a servo pattern is disclosed in the official gazette of Japanese Patent Application Publication No. 64812/1988. In writing the servo pattern, this technique employs a magnetic head having a core width which is not smaller than the product between the width of a track and the number of phases of the servo pattern. After having erased a target track in one predetermined direction with D.C. beforehand, the magnetic head causes a current opposite in sense to the erasing D.C. to flow through the designated region of the track so as to write the servo pattern. The magnetic head writes on and on through this operation while repeating its advances and retreats in the radial direction of tracks.

On the other hand, a technique for reading out a written servo pattern and verifying write signals is disclosed in the official gazette of Japanese Utility Model Registration Application Laid-open No. 105967/1988. With this technique, the same magnetic head as one having written the servo pattern is used for reading and verifying this servo pattern.

SUMMARY OF THE INVENTION

The inventors have found out that disadvantages to be explained below are involved in the prior-art technique for writing the servo pattern.

The first disadvantage is that the influence of dispersion in an effective write length which fluctuates depending upon the characteristics of the magnetic head and the recording medium appears in the reproduced signal of the servo pattern, so a position sensitivity based on the reproduced signal is liable to fluctuate depending upon the property of the recording medium, the shape of the magnetic head, etc.

Referring now to the drawings, the first disadvantage will be explained in detail.

Figure 11A:
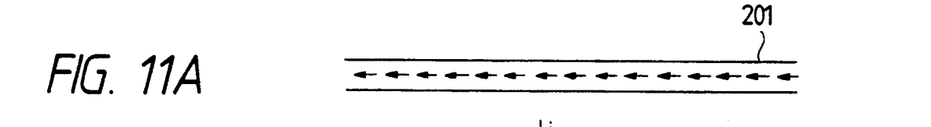
FIGS. 11A thru 11C are diagrams for elucidating an effective write length, in the case where a magnetic head records information on a recording medium.
Figure 11B:
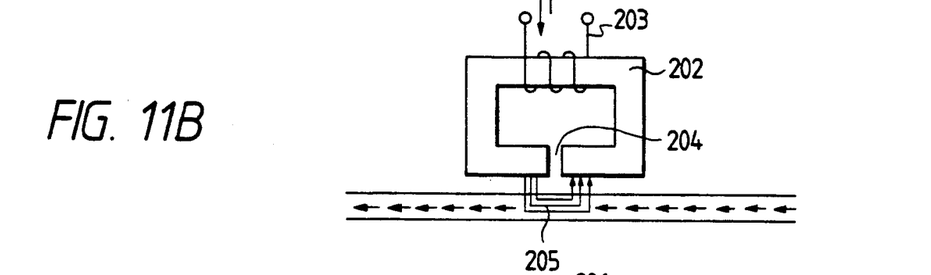
Figure 11C:
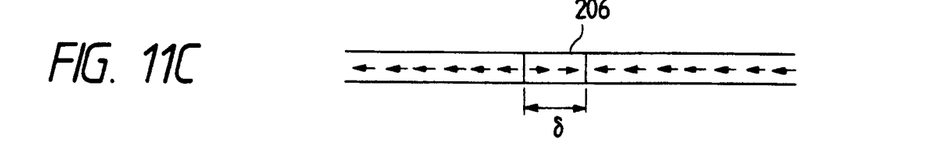

FIGS. 11A–11C are diagrams for elucidating the concept of the effective write length. FIG. 11A shows the state in which a track on a recording medium 201 has been erased in one direction with D.C. beforehand. Leftward arrows on the recording medium 201 denote the sense of residual magnetization based on the D.C. erase. In FIG. 11B, a magnetic head 202 is located to the recording medium 201 having completed the D.C. erase, and it performs a write operation without changing its position relative to the recording medium 201. The write operation is effected by conducting a current i through a head coil 203 in a sense in which a magnetic flux 205 indicated by rightward arrows and being opposite in sense to the residual magnetization based on the D.C. erase is generated around a head core gap 204. FIG. 11C shows the state of residual magnetization left on the recording medium 201 after the write operation illustrated in FIG. 11B has been completed. The length $\delta$ of a region of rightward arrows, namely, a region of inverted magnetization 206 is the effective write length.

Figure 12A:
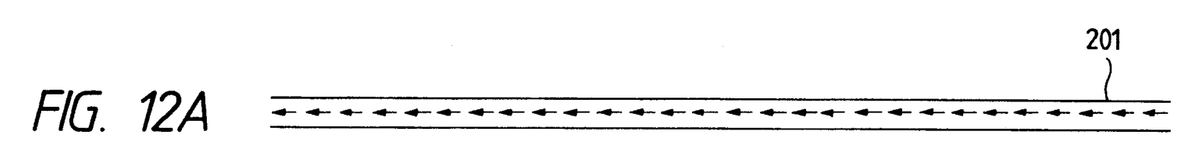
FIGS. 12A thru 12C are diagrams for elucidating steps in the case where the magnetic head writes information on the recording medium sequentially.
Figure 12B:
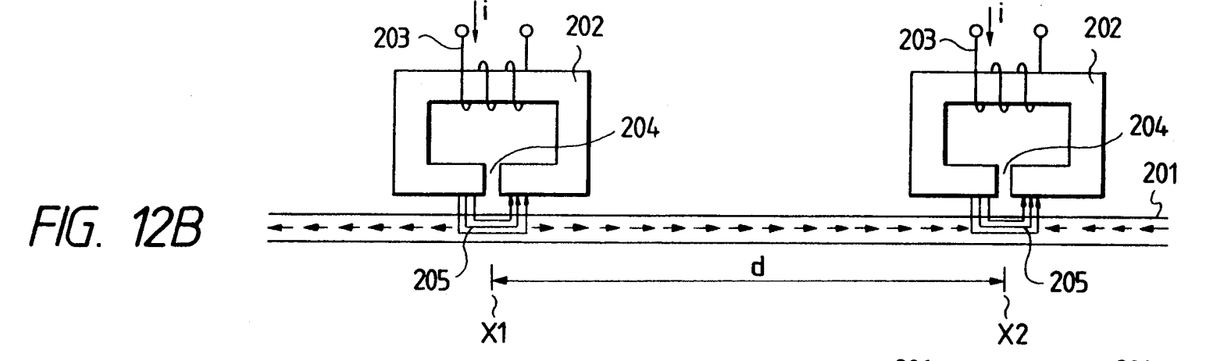
Figure 12C:
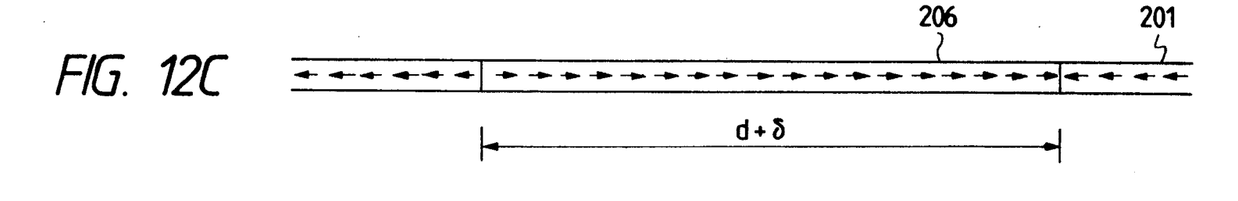

FIGS. 12A–12C are explanatory diagrams showing the states of residual magnetization in the case where the servo pattern has been written with the prior-art technique by the use of the combination between the magnetic head 202 and the recording medium 201 exhibiting the effective write width as described above.

Likewise to FIG. 11A, FIG. 12A shows the state of the recording medium 201 subjected to the D.C. erase. FIG. 12B shows the write operation in which the current i adapted to induce the rightward magnetization is applied to the magnetic head 202 at a position X1, the magnetic head 202 is moved to a position X2 relatively to the recording medium 201 while holding the current application state, and the application of the current i is stopped at the position X2.

As the result of the write operation, the region of inverted residual magnetization 206 is formed on the recording medium 201 as shown in FIG. 12C. The length of the inverted region 206, in other words, the length of the servo pattern becomes the sum between the effective write length $\delta$ elucidated before and the movement distance d of the magnetic head 202 relative to the recording medium 201.

In order to form the servo pattern of the desired length d, therefore, the timings of the application of the current i to the head coil 203 and the stop thereof may be set off to the amount of the effective write length $\delta$. As stated before, however, the effective write length $\delta$ fluctuates depending upon various factors such as the materials of the magnetic head 202 and recording medium 201, the shape of the magnetic head 202, the thickness and oriented state of a magnetic substance constituting the recording medium 201, the gap between the magnetic head 202 and the recording medium 201, and the value of the current i, so that the control of the effective write length $\delta$ to be constant is difficult.

The second disadvantage is that the D.C. erase operation for the target track and the servo pattern write operation for the specified region within the track cannot avoid being performed at individual timings, so the magnetic head must be passed twice along each individual track, and a period of time required for writing all servo patterns becomes very long.

The third disadvantage is that, in recording the servo patterns, the D.C. erase operation based on the forward movement of the magnetic head and the servo pattern write operation based on the backward movement thereof are repeated, so errors ascribable to the inferior positioning accuracy of the magnetic head develop under the influences of the "play" of a positioning mechanism for driving the magnetic head, a backlash caused by a hysteresis element, etc.

Next, the inventors have found out that disadvantages to be explained below are involved in the prior-art verification technique for verifying the absence of any write error with the single magnetic head.

In the magnetic disk, the recording surface to form servo tracks has servo patterns written thereinto so as to be continuous without any clearance in the radial direction of this disk. Letting lW denote the core width of a writing magnetic head, lR denote the core width of a reading magnetic head, and lP denote the pitch of the tracks into which the servo patterns are to be written, it is important that the core widths of the writing and reading magnetic heads in the operation of recording single-phase or multiphase servo patterns satisfy the following conditions:

lW>lP, lR<2lP . . . servo pattern in a single phase,
lW>2lP, lR<2 lP . . . servo pattern in two phases, and
lW>nlP, lR<2 lP . . . servo pattern in n phases.

In view of such conditions, in the case where the single magnetic head is employed for both the write and read steps in the operation of recording the servo tracks formed of the single-phase servo patterns, the magnetic head whose core width is lR/W=(1.5 to 1.8) lP is used.

Consequently, in recording the servo tracks on different types of magnetic disks, one having a track pitch twice that of the other, there occurs the problem that the verification cannot be coped with unless magnetic heads are changed at the individual write and read steps.

Besides, when the servo patterns in the two or more phases are written with the core width which corresponds to the single-phase servo patterns, there is the problem that, since the servo pattern to be recorded astride the adjacent tracks is not completely recorded between the tracks, the linearity of the displacement—position signal output of the magnetic head degrades in case of decoding the servo pattern into position signals. As a further problem, it is essentially impossible to employ the single magnetic head for both the write and read steps when a servo pattern of high quality affording a high linearity is to be recorded.

The present invention has been made in order to solve the above disadvantages, and has for its first object to provide a servo information recording method which is capable of precisely recording servo information on a recording medium without being influenced by fluctuations in the effective write length of a magnetic head, a backlash in a positioning control mechanism, or the like.

The second object of the present invention is to provide a servo information recording method which is capable of shortening a period of time required for the operation of recording servo information into a recording medium.

The third object of the present invention is to provide a servo information recording apparatus which is capable of recording servo information on different types of recording media of unequal track pitches and then verifying the recorded servo information without changing a magnetic head.

The fourth object of the present invention is to provide a servo information recording apparatus which is capable of recording multiphase servo information on a recording medium and then verifying the recorded servo information without changing a magnetic head.

The present invention for accomplishing the aforementioned objects is characterized as follows: A plurality of regions determined by a servo system are set in those tracks of a magnetic disk into which the magnetic disk is divided in the shape of a plurality of concentric circles. In a case where the servo system is of two phases, the four regions of the first to fourth ones are defined. The four regions are provided sequentially over one round of each track. The width of the recording surface of a magnetic head which records servo information on the track, is set in accordance with the above servo system. In the present invention, the width of the recording surface is set to be greater than the width of the track as multiplied by the number of phases of the servo system.

To begin with, the magnetic head is located to the first track. In the first track, a signal for forming a servo signal is written into a predetermined region, and all the remaining regions are erased with D.C. It is noteworthy here that the recording width of the magnetic head, namely, the width of a core portion is set to be greater than the track width, so when the information is recorded in the first track, the same signal is recorded in the second track et seq. adjoining the first track.

Subsequently, when the recording of the first track has ended, the magnetic head is moved to the adjacent second track. Here, either D.C. erase or recording nothing is selected for the region where the servo signal has been written into the second track beyond the first one. That is, the part of the already-recorded region to be erased is erased with D.C., and the part thereof not to be erased is skipped so as to hold the written information. In the region of the second track adjoining each region of the first track subjected to the D.C. erase at the stage of recording the first track, D.C. erase is performed, or a signal for forming a servo signal is written.

When the recording of the second track has ended, the magnetic head is moved to the next track, and it repeats the same operation as the write operation in the second track.

By forming the servo information in the above way, the tracks of the magnetic disk can be recorded while the magnetic head is being moved in one direction, for example, from the outermost track to the innermost one.

Further, in the present invention, an apparatus which writes the servo information in conformity with the method stated above and which inspects if the servo information has been correctly written is constructed using two magnetic heads (transducers) whose recording surfaces have unequal widths. That is, the individual magnetic heads are employed for recording the servo information and for reading it out. The recording magnetic head has its core width set to be greater than the width of the track multiplied by the number of phases. The reproducing magnetic head has its core width set to be less than the track width multiplied by the number of phases. Here, the "number of phases" signifies the number which is determined by the servo system as described before.

The recording and reproducing magnetic heads are fixed so as as be simultaneously positioned to the identical recording surface of the magnetic disk. Thus, the servo information is written with the recording magnetic head, and it is read out with the reproducing magnetic head.

DESCRIPTION OF THE PREFERRED EMBODIMENTS

Now, an example of a servo information recording method which is an embodiment of the present invention will be described in detail with reference to the drawings.

Figure 4:
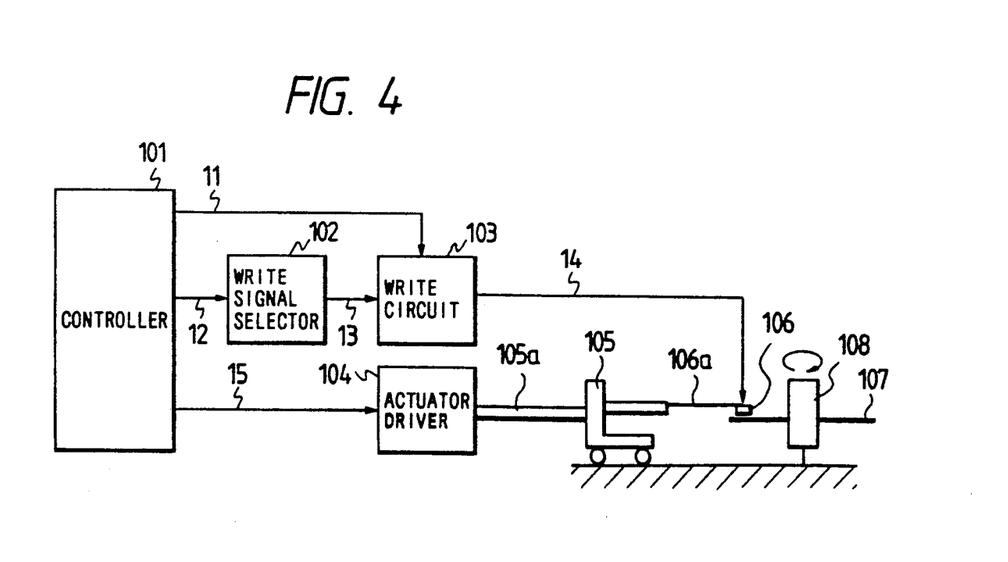
FIG. 4 is a block diagram showing an example of the construction of a servo information recording apparatus which executes the write operation.

FIG. 4 shows the construction of a servo information recording apparatus for writing servo information in this embodiment.

A plurality of magnetic disks are coaxially fixed to a spindle hub 108 which is driven by a motor not shown. One 107 of the magnetic disks is subjected to the recording of servo patterns as described later. A magnetic head 106 is arranged so as to oppose to the recording surface of the magnetic disk 107. The magnetic head 106 is supported through an arm 106a by an actuator 105 which is provided so as to be freely displaced in the radial direction of the magnetic disk 107. The actuator 105 is connected through a coupling member 105a to an actuator driver 104 which includes, for example, a linear motor. Thus, the magnitude, speed etc. of the displacement in the radial direction of the magnetic disk 107 are controlled together with the direction of the displacement.

Connected to the magnetic head 106 is a write circuit 103 which applies a write current 14 to this magnetic head 106. The write circuit 103 is fed with a write current pattern 13 from a write signal selector 102 which is disposed at an upper stage.

The write circuit 103, write signal selector 102 and actuator driver 104 are respectively controlled by a write instruction 11, a pattern select instruction 12 and a drive instruction 15 which are all given by a controller 101.

Now, an example of the operation of the servo information recording method in this embodiment will be described with reference to FIGS. 1A thru 3.

In this embodiment, two-phase servo patterns the number of phases P of which is 2 will be exemplified. With the two-phase servo patterns, four sorts of regions indicated at $S_1$-$S_4$ in FIGS. 1A-1D and FIG. 2 are defined as regions for recording the servo patterns. In correspondence with the servo patterns to be recorded in the respective regions, four sorts of current patterns $IP_1$, $IP_2$, $IP_3$ and $IP_4$ are prepared as the write current patterns 13. The respective patterns are determined by three sorts of current values $+i$, $0$ and $-i$.

The core width lc of the magnetic head 106 for writing these servo patterns is set to be greater than the pitch lt between the adjacent tracks of the magnetic disk 107 as multiplied by the number of phases P (in this embodiment, it is set to be the track pitch lt multiplied by 2.5).

First, in starting the recording of the servo patterns, the controller 101 issues the drive instruction 15 to the actuator driver 104. This actuator driver 104 having received the instruction displaces the actuator 105 through the coupling member 105a properly, whereby the magnetic head (transducer) 106 is located to a desired position (for example, the outermost peripheral part of the magnetic disk 107) at which the first track in the radial direction of the magnetic disk 107 is to be recorded (step 31 in FIG. 3).

Figure 3:
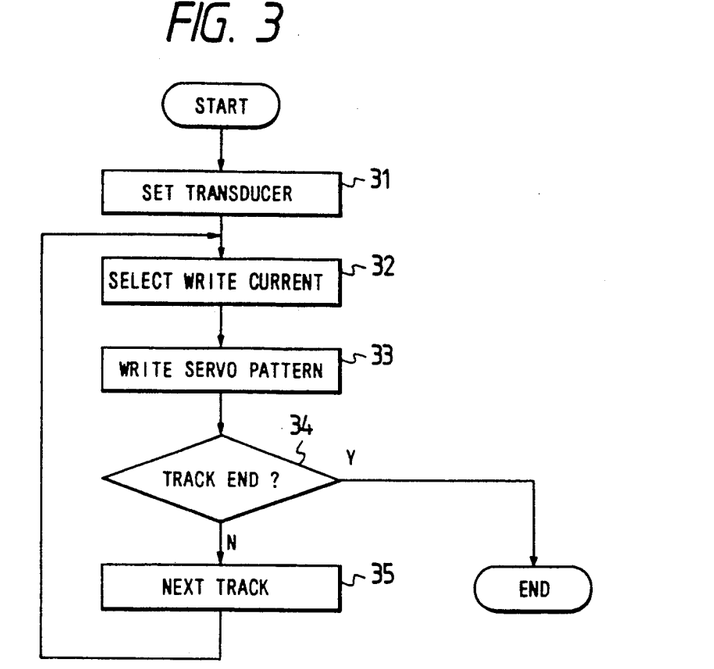
FIG. 3 is a flow chart showing the steps of a write operation.

Thereafter, the controller 101 issues the pattern select instruction 12 to the write signal selector 102, by which one of the aforementioned current patterns $IP_1$-$IP_4$ is selected as the write current pattern 13 corresponding to the pertinent track (step 32).

Subsequently, the controller 101 issues the write instruction 11 to the write circuit 103 at the very point of time at which the predetermined rotational position of the rotating magnetic disk 107 passes directly below the magnetic head 106. The write circuit 103 having received the instruction 11 applies to the magnetic head 106 the write current 14 which is based on the write current pattern 13 obtained from the write signal selector 102, whereby the servo pattern corresponding to the pertinent track is written (step 33).

Besides, when the magnetic disk 107 has been rotated one revolution to complete the writing of the servo pattern into the track corresponding to the present position of the magnetic head 106, the controller 101 decides whether or not the pertinent track is the last one to be recorded (step 34).

In a case where the last track is not reached, the controller 101 issues the drive instruction 15 to the actuator driver 104, whereby the magnetic head 106 is moved in the direction of advancing to write a track (herein, toward the center of the magnetic disk 107) to the amount of the track pitch lt and is located to a position at which the next track is to be written (step 35).

Thereafter, the control flow returns to the step 32, and the operations of the steps 32 et seq. are repeated. At the point of time at which the step 34 has decided the completion of the writing of the last track, the recording of the servo tracks on the pertinent magnetic disk 107 is ended.

Now, the substeps of the step 33 for writing the servo pattern will be described with reference to FIGS. 1A-1D. Here, the magnetic head 106 forms the servo pattern while changing-over the three operations of a servo signal write operation, a D.C. erase operation, and a write stop operation in which nothing is written.

Figure 1A:
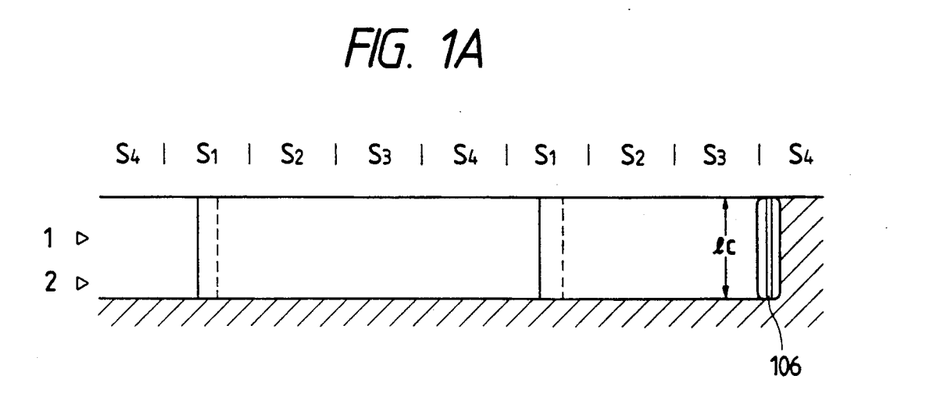
FIGS. 1A thru 1D are diagrams showing the steps of a servo information recording method which is the first embodiment of the present invention.

First, as illustrated in FIG. 1A, the magnetic head 106 is initially located to Track-1, and it performs the signal write operation at the position $S_1$ and the D.C. erase operations at the positions $S_2$-$S_4$. In the D.C. erase operation, the magnetic head 106 is supplied with the current $-i$ [A] as the write current 14. In the signal write operation, the magnetic head 106 is supplied as the write current 14 with a current whose value changes from $-i$ [A] to $+i$ [A] and then returns to $-i$ [A] after a predetermined period of time. Since the current value always becomes $-i$ [A] at the end parts of the signal write operations, the direction of residual magnetization becomes the same as in the D.C.-erased regions, and the inversion of magnetization does not take place. In FIGS. 1A-1D, symbol "▷" indicates a position which is recognized as the center of each track in case of reading out the written servo pattern. Besides, a vertical solid line indicates the magnetization inversion of plus polarity, while a vertical broken line indicates the magnetization inversion of minus polarity. Further, a hatched part is a region in which the write operation is not performed yet. The core width lc of the magnetic head 106 is set to be greater than the product between the track width lt and the number of phases P of the servo signal. In the example of FIGS. 1A-1D, P=2 is held, and hence, the core width lc is set to be somewhat greater than 2 lt.

Figure 1B:
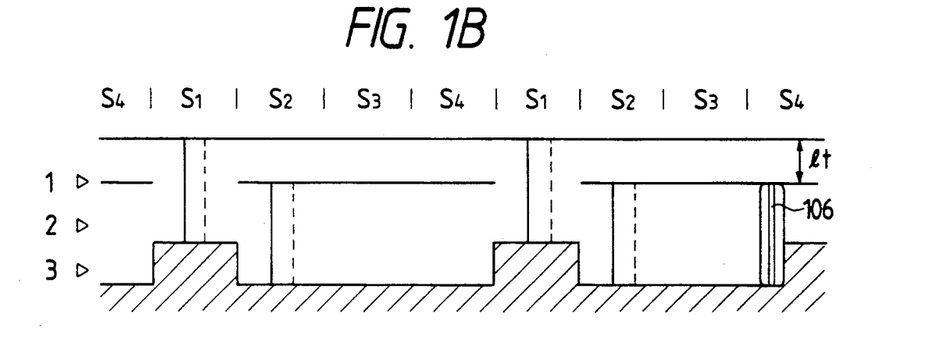

When the servo pattern formation of Track-1 has ended, the magnetic head 106 is moved the track width lt, and the servo pattern formation of Track-2 is started. As illustrated in FIG. 1B, the signal write operation is performed in the region $S_2$ of Track-2, the D.C. erase operations are performed in the regions $S_3$ and $S_4$, and the write stop operation in which the supply of the write current 14 to the magnetic head 106 is stopped is performed in the region $S_1$. Thus, the servo signal written in Track-1 is prevented from being erased.

Figure 1C:
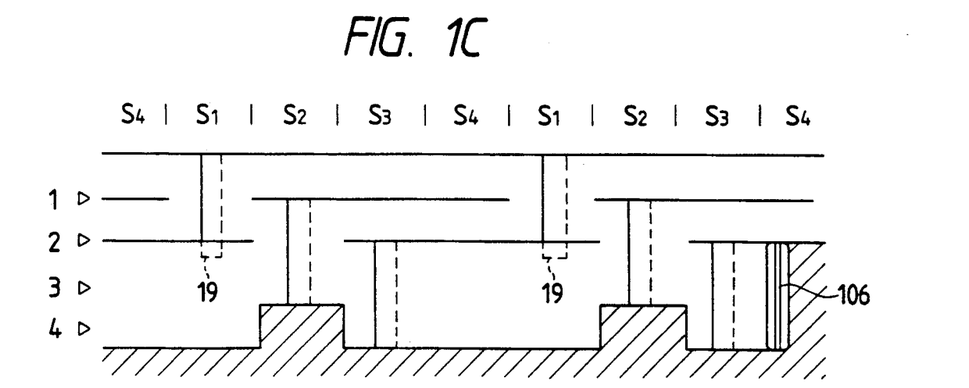

When the servo pattern formation of Track-2 has ended, the magnetic head 106 is moved the track width lt, and the servo pattern formation of Track-3 is started. As illustrated in FIG. 1C, the signal write operation is performed in the region $S_3$ of Track-3, the D.C. erase operations are performed in the regions $S_1$ and $S_4$, and the write stop operation is performed in the region $S_2$. Thus, that part of the signal of Track-1 which has been written into a region 19 in a manner to protrude to the side of Track-3 is erased.

In Tracks-(n+3) et seq., similarly to the above, the write current patterns $IP_4$, $IP_1$, $IP_2$, $IP_3$, ... whose phases are successively shifted in correspondence with the rotational angles of the individual regions $S_1$-$S_4$ are selected, and the signal write operations, D.C. erase operations and write stop operations are repeatedly performed.

Figure 1D:
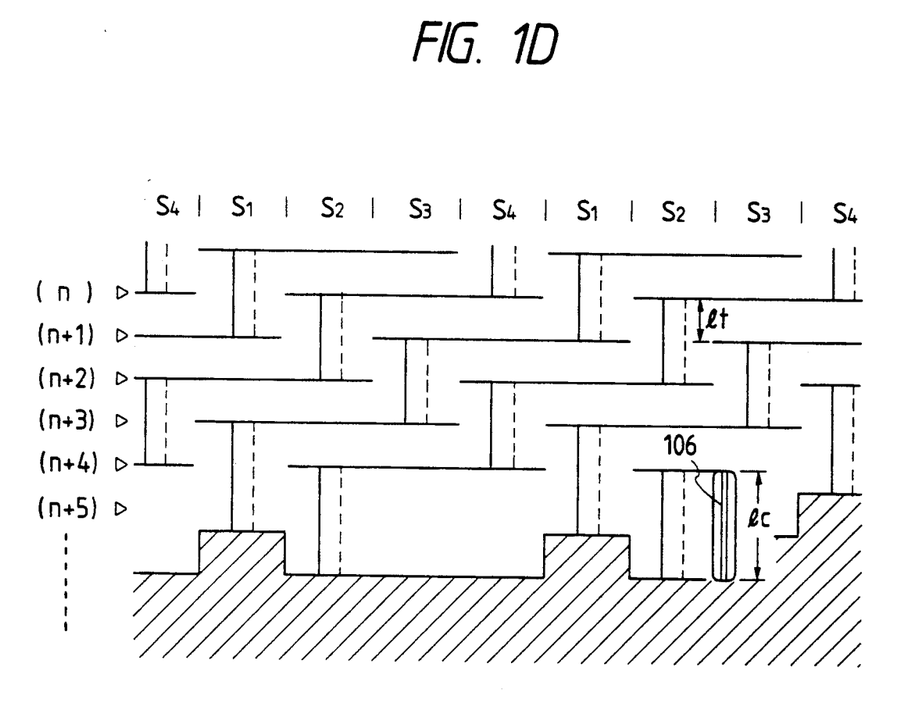
Figure 2:
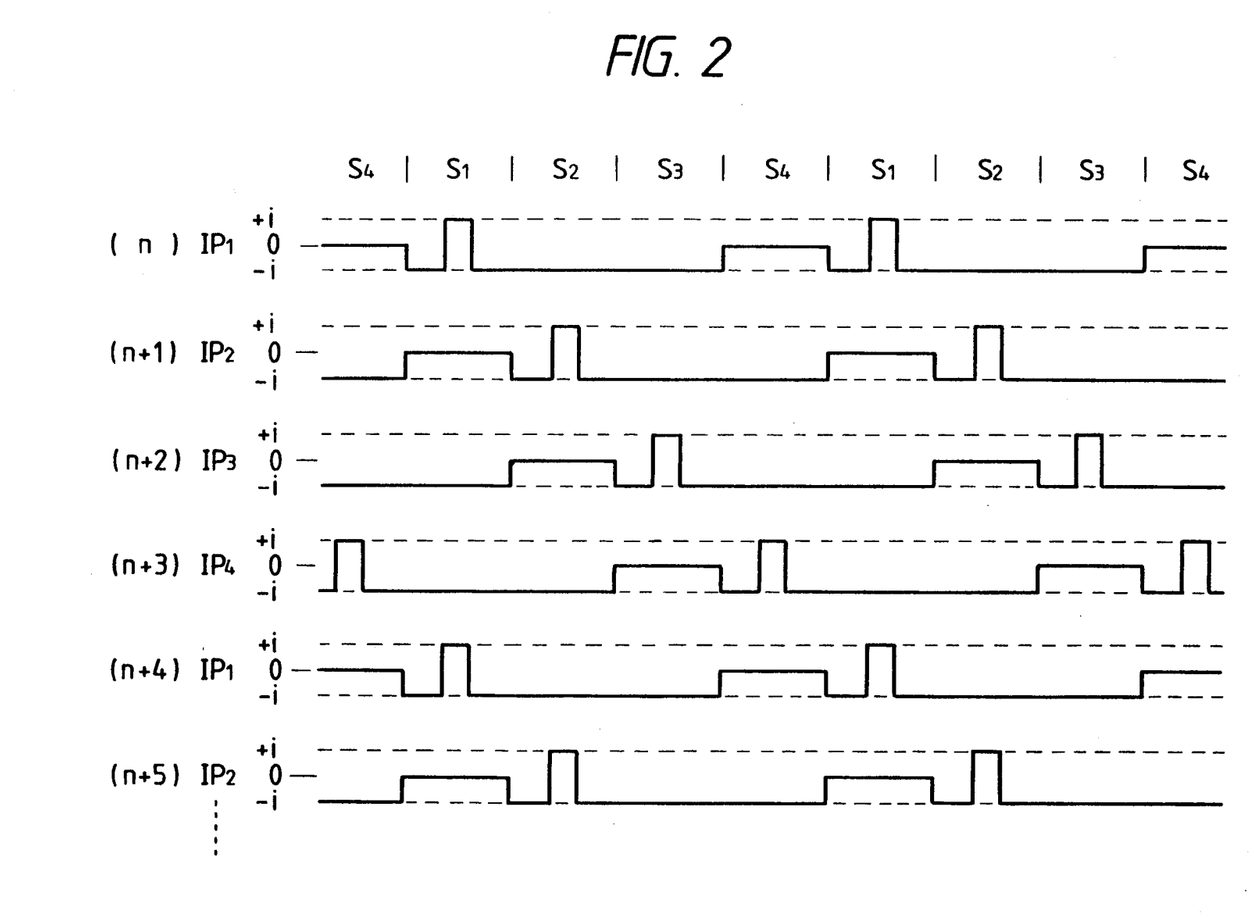
FIG. 2 is a diagram showing examples of the waveform of a write current which is supplied to a magnetic head.

It is FIG. 1D that exemplifies the state of the residual magnetization of the magnetic disk 107 subjected to a series of such operations. As seen from the figure, the servo patterns which are formed on the individual tracks are not written deviating in the peripheral direction of the magnetic disk with the boundaries at the center lines of these tracks. Moreover, on the rear end side of each servo pattern, the write current 14 changes from the value $+i$ to the same value $-i$ as in the D.C. erase, so that the direction of the residual magnetization in the end region becomes the same as in the D.C.-erased region. Thus, the deviation of a magnetization inversion width attributed to the dispersion of the effective write length of the magnetic head 106 can be eliminated to write the uniform servo patterns of high quality which are less susceptible to fluctuations in the various characteristics of the magnetic head 106, the magnetic disk 107, etc.

Now, a servo information recording apparatus for writing servo signals according to the present invention will be described with reference to FIGS. 5 thru 7.

Figure 7:
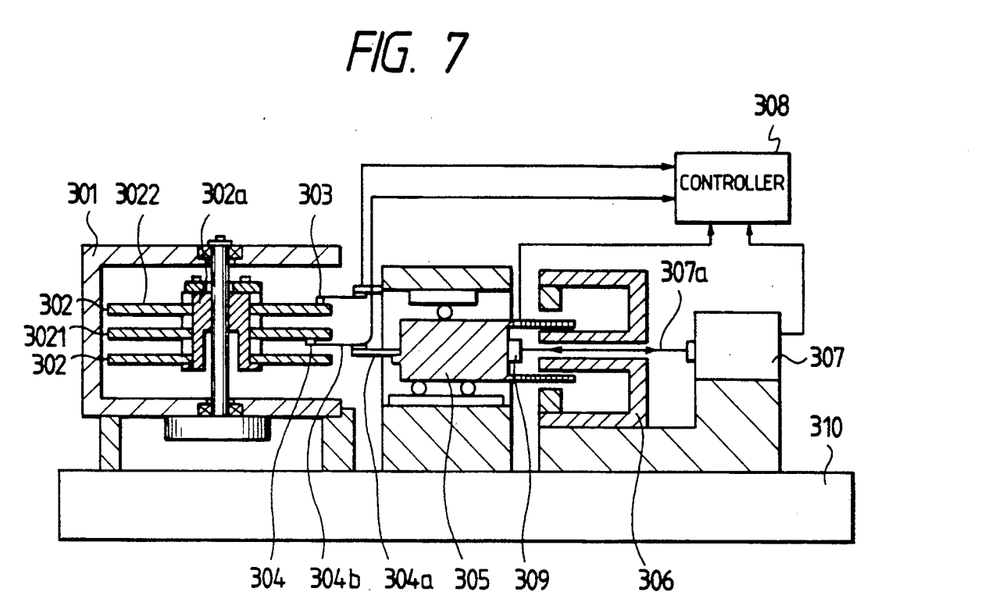
FIG. 7 is a sectional view showing an example of the construction of a servo information recording apparatus which is the second embodiment of the present invention.

In FIG. 7, a magnetic disk rotation driver 301 is placed on a base 310.

In the magnetic disk rotation driver 301, a plurality of magnetic disks 302 are coaxially set on a spindle hub 302a whose axis is held substantially vertical, and which is rotated at a predetermined speed by a spindle motor not shown.

By the side of the magnetic disk rotation driver 301, a carriage 305 which is similarly supported on the base 310 is arranged so as to be freely displaced radially of the magnetic disks 302. The direction, speed and magnitude of the displacement of the carriage 305 are freely controlled by a voice coil motor 306 which is connected to the rear side of this carriage.

In addition, the voice coil motor 306 is controlled by a control signal from a controller 308. A laser beam reflector 309 is fixed on the rear side of the carriage 305, and it reflects a laser beam 307a, which is emitted through the central part of the voice coil motor 306 from a laser position detector 307 supported on the base 310, toward this laser position detector 307. Thus, the laser position detector 307 observes the interference condition etc. of the laser beam 307a reciprocating between it and the laser beam reflector 309, thereby to precisely measure the displacement of the carriage 305 in the radial direction of the magnetic disks 302.

The servo information of the carriage 305 obtained by the laser position detector 307 is fed back to the controller 308 which controls the voice coil motor 306 for driving this carriage 305, so that the controller 308 precisely controls the displacement of the carriage 305 by means of a well-known closed loop control.

Figure 6:
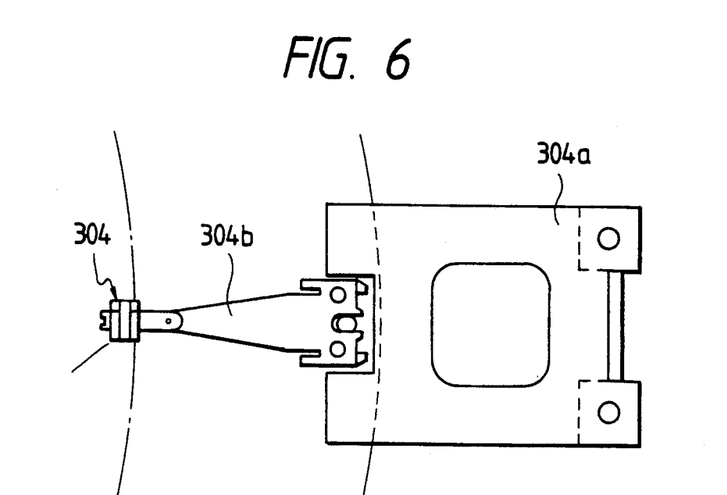
FIG. 6 is a plan view showing the mounting portion of the magnetic head in FIG. 5.

A magnetic head 304 is fixed to the side surface of the carriage 305 confronting the magnetic disk 302, through an arm 304a and a leaf spring 304b as shown in FIG. 6 so as to oppose to one recording surface 3021 of the middle magnetic disk 302.

This magnetic head 304 is located to any desired position of the recording surface 3021 of the magnetic disk 302 by the displacement of the carriage 305 which is driven by the voice coil motor 306. As shown in FIG. 5, the magnetic head 304 is constructed of a slider 3041 which opposes to the recording surface 3021 of the magnetic disk 302 with a predetermined gap defined therebetween, in such a way that a dynamic lift, a suction force, etc. balancing the elastic force of the leaf spring 304b are developed by an air stream formed on the surface of the rotating magnetic disk 302, and a plurality of core portions 3042 and 3043 which are fixed to the end face of the slider 3041.

The core portions 3042 and 3043 are respectively connected to the controller 308 through leads 3042a and 3043a, and they are fabricated by, for example, photolithography employed in the production of semiconductor integrated circuit devices. The core widths lW and lR of the respective core portions 3042 and 3043 are set at values different from each other.

Here, the core portion 3042 operates to write a servo pattern with a current of desired waveform applied from the controller 308, while the core portion 3043 operates to read out and thus verify the written servo pattern.

On the other hand, a clock head 303 is supported on part of that housing of the carriage 305 which is fixed to the base 310 into a stationary state, so as to oppose to that recording surface 3022 of the magnetic disk 302 which is other than the surface 3021 for recording the servo pattern. The clock head 303 operates to record/reproduce a clock signal for grasping the rotational position of the magnetic disk 302, and the operations of recording/reproducing the clock signal are controlled by the controller 308.

Now, the operation of the servo information recording apparatus of this embodiment as described above will be exemplified.

Figure 9:
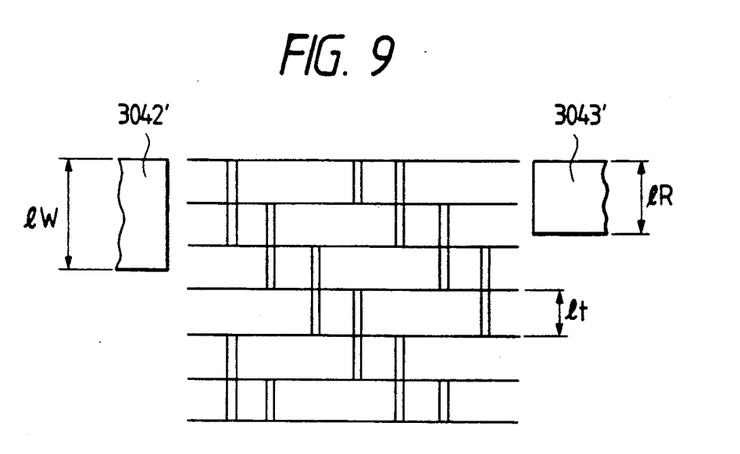
FIG. 9 is a conceptual diagram for elucidating the operation of the servo information recording apparatus which is the second embodiment of the present invention.

By way of example, in case of writing a servo pattern in two phases as shown in FIG. 9, the core width lW of the magnetic head 304 for the write operation is set to be greater than double a track pitch lt (lW>2·lt).

Besides, the core width lR of the magnetic head 304 for the operation of reading out the written servo pattern is set to be less than double the track pitch lt (lR<2·lt), for the purpose of excluding the influence of a read signal from another track adjacent to a target track position.

In executing the actual write operation, the controller 308 moves the carriage 305 through the voice coil motor 306 until the magnetic head 304 is located to a write start position at the outermost periphery of the magnetic disk 302.

Subsequently, the controller 308 beings to impress a write current of predetermined waveform on the core portion 3042 of the magnetic head 304 at a predetermined timing which is obtained from the clock head 303, that is, at the point of time at which the desired rotational position of the magnetic disk 302 passes underneath the core portion 3042. Then, the servo patterns for one revolution of the magnetic disk 302 are written into the recording surface 3021 thereof.

On this occasion, the two-phase servo pattern extending over two adjacent tracks is written at one time without a seam because, in the case of this embodiment, the core width lW of the core portion 3042 for the write operation is set to be greater than double the track pitch lt. Thenceforth, the operations of writing the servo patterns are executed while the magnetic head 304 is being successively moved toward the center of the magnetic disk 302.

When the servo patterns corresponding to the desired number of tracks have been written, the magnetic head 304 is brought back to the outermost periphery of the magnetic disk 302. Subsequently, using the core portion 3043 provided in the magnetic head 304, the servo patterns already written are read out and are decoded into position signals indicative of track positions, and the accuracies of the track pitches, positioning operations, etc. to be attained are verified with the decoded signals.

On this occasion, the influence of the read signal from any track region other than the target track can be excluded to precisely execute the operation of verifying the servo patterns written on the recording surface 3021, because in the case of this embodiment, the core width lR of the core portion 3043 for the verify operation is set less than double the track pitch lt independently of the core portion 3042 for the write operation.

Figure 10:
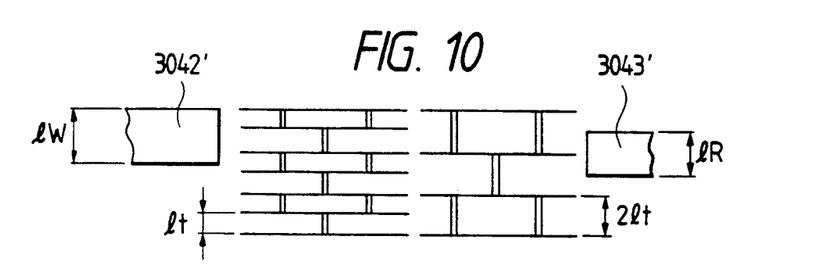
FIG. 10 is a conceptual diagram for elucidating another operation of the servo information recording apparatus which is the second embodiment of the present invention.

Incidentally, although the case of the two-phase servo pattern has been explained in the above example, a servo pattern in a single phase can also be written as illustrated in FIG. 10. In the figure, cases where the track pitches are lt and 2·lt are respectively shown at the left and right parts for the sake of comparison. It is understood that, when the core widths lW and lR of the core portion 3042 for the write operation and the core portion 3043 for the read operation are respectively set at lW>2·lt and lR<2·lt as described before, the operation of writing servo patterns and the verify operation based on reading out the written servo patterns can be executed for any track pitch within a range from lt to 2·lt as in this embodiment, without changing the magnetic head 304.

In this manner, according to the servo information recording apparatus of this embodiment, the operations of writing and verifying servo patterns corresponding to unequal track pitches can be carried out without changing the magnetic head 304. Therefore, when the embodiment is applied to the production line of magnetic disks in which a plurality of sorts having different track pitches are coexistent, the productivity of the magnetic disks is enhanced.

Moreover, even in a case where for the purpose of forming a servo pattern in a plurality of phases, the core width lW of the core portion 3042 for the write operation is set to be greater than the track pitch lt multiplied by the number of phases, the read operation for verifying the written servo pattern is performed by the separate core portion 3043 whose core width lR is set to be less than double the track pitch lt. Therefore, the influence of a read signal from another track region adjacent to a target track region can be reliably excluded, and the absence of any defect, etc. can be verified at high precision on the basis of the readout of the servo pattern.

Although, in the above, the invention made by the inventor has been concretely described in conjuction with embodiments, it is a matter of course that the present invention is not restricted to the foregoing embodiments, but that it can be variously altered within a scope not departing from the purport thereof.

Figure 5:
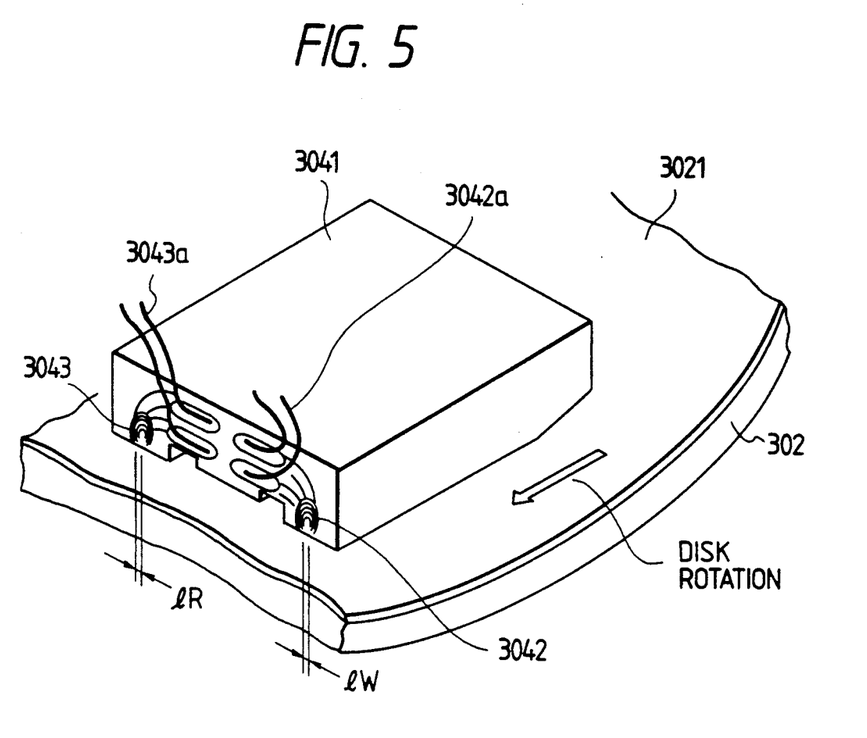
FIG. 5 is a perspective view showing the construction of the magnetic head of a servo information recording apparatus which is one embodiment of the present invention.
Figure 8:
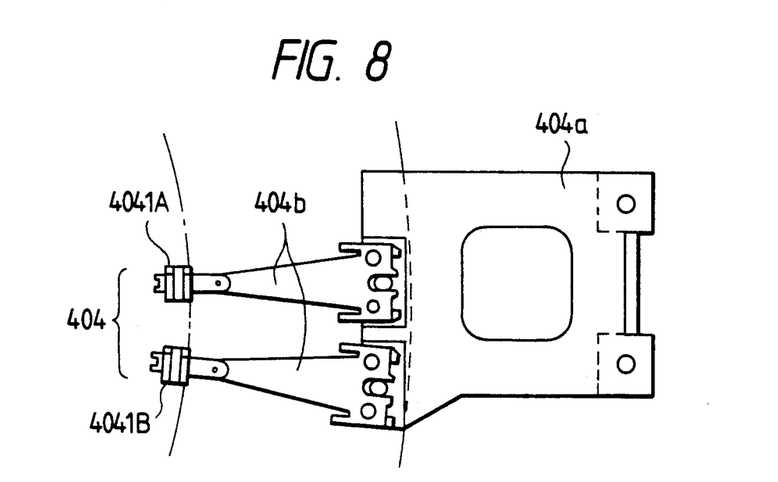
FIG. 8 is a plan view showing an example of the mounting portion of a magnetic head in FIG. 7.

By way of example, although the magnetic head in FIG. 5 is provided with the two core portions 3042 and 3043, these portions can also be disposed on separate magnetic heads. More specifically, as illustrated in FIG. 8, two head arms 404b are provided, and two magnetic heads 4041A and 4041B are fixed so as to lie over the identical circumference of the magnetic disk 302. The magnetic head 4041A is formed with the core portion 3042 for the write operation, while the magnetic head 4041B is formed with the core portion 3043 for the read operation.

We claim:

1. A method wherein servo information is written through a magnetic head into a recording medium which is divided into a plurality of concentric tracks; comprising the steps of:

setting a first signal for erasing said recording medium, and a second signal for forming a servo signal on said recording medium;

locating said magnetic head to a certain one of the tracks;

selecting between the first signal and the second signal, and recording in an alternating manner both the first and second signals over a whole circumference of the same track;

locating said magnetic head to a next one of the tracks;

setting a part for recording signals and a part for recording no signals, in the next track;

selecting between the first signal and the second signal, and recording in an alternating manner both the first and second signals in said part for recording signals; and     repeating the step of locating said magnetic head to a next one of the tracks, the step of setting a part for recording signals and a part for recording no signals, and the step of recording the first or second signal in the part for recording signals.

2. The method according to claim 1, wherein a plurality of regions which appear recurrently are set in each track, and the servo information is defined by combinations of the second signals written in said plurality of regions.

3. The method according to claim 2, further comprising the step of setting a width of said magnetic head in correspondence with the number of said plurality of regions.

4. The method according to claim 2, wherein at the step of setting the recording part and the non-recording part, a region adjacent to the region of the immediately preceding track in which said second signal has been recorded is set as said part for recording no signals.

5. The method according to claim 1, wherein said first signal for erasing is a minus fixed current signal which is applied to said magnetic head.

6. The method according to claim 5, wherein said second signal for said servo signal is produced from a combination of a plus fixed current signal and the minus fixed current signal which are applied to said magnetic head.

7. An apparatus for writing servo information through a magnetic head into a recording medium which is divided into a plurality of concentric tracks; comprising:

means for setting a first signal for erasing said recording medium, and a second signal for forming a servo signal on said recording medium;

means for locating said magnetic head to a certain one of the tracks;

means for selecting between the first signal and the second signal, and recording in an alternating manner both the first and second signals over a whole circumference of the same track;

means for locating said magnetic head to a next one of the tracks;

means for setting a part for recording signals and a part for recording no signals, in the next track;

means for selecting between the first signal and the second signal, and recording in an alternating manner both the first and second signals in said part for recording signals; and     means for repeating the step of locating said magnetic head to a next track, the step of setting a part for recording signals and a part for recording no signals, and the step of recording the first or second signal in the part for recording signals.

8. The apparatus according to claim 7, including means for setting in each track a plurality of regions which appear recurrently such that the servo information is defined by combinations of the second signals written in said plurality of regions.

9. The apparatus according to claim 8, further comprising means for setting a width of said magnetic head in correspondence with the number of said plurality of regions.

10. The apparatus according to claim 8, wherein said means for setting a part for recording signals and a part for recording no signals sets a part for recording no signals in a region adjacent to the region of the immediately preceding track in which said second signal has been recorded.

11. The apparatus according to claim 7, wherein said first signal for erasing is a minus fixed current signal which is applied to said magnetic head.

12. The apparatus according to claim 11, wherein said second signal for said servo signal is produced from a combination of a plus fixed current signal and the minus fixed current signal which are applied to said magnetic head.

* * * * *